United States Patent
Glaz et al.

(10) Patent No.: US 9,587,652 B2
(45) Date of Patent: Mar. 7, 2017

(54) HYDROSTATIC DRIVE, IN PARTICULAR HYDROSTATIC FAN DRIVE

(71) Applicant: Robert Bosch GmbH, Stuttgart (DE)

(72) Inventors: Igor Glaz, Ulm (DE); Steffen Loritz, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 14/445,240

(22) Filed: Jul. 29, 2014

(65) Prior Publication Data

US 2015/0033728 A1 Feb. 5, 2015

(30) Foreign Application Priority Data

Jul. 30, 2013 (DE) .................. 10 2013 214 807

(51) Int. Cl.
*F15B 15/06* (2006.01)
*E02F 9/22* (2006.01)
(Continued)

(52) U.S. Cl.
CPC ............ *F15B 15/06* (2013.01); *E02F 9/2285* (2013.01); *E02F 9/2296* (2013.01); *F04B 49/002* (2013.01); *F04D 19/002* (2013.01); *F04D 25/04* (2013.01); *F16H 61/431* (2013.01); *F16H 61/433* (2013.01); *F15B 2211/20553* (2013.01); *F15B 2211/55* (2013.01); *F15B 2211/575* (2013.01); *F15B 2211/5753* (2013.01); *F15B 2211/5756* (2013.01); *F15B 2211/6333* (2013.01); *F15B 2211/6652* (2013.01)

(58) Field of Classification Search
CPC ........ F04D 19/002; F04D 25/04; F15B 15/06; F15B 2211/20553; F15B 2211/55; F15B 2211/575; F15B 2211/5753; F15B 2211/5756; F15B 2211/6333; F15B 2211/6652; F16H 61/431; F16H 61/433; B60K 25/00; F04B 49/002; F04B 49/08; E02F 9/2285; E02F 9/2296

See application file for complete search history.

(56) References Cited

U.S. PATENT DOCUMENTS 9,091,040 B2 * 7/2015 Peterson ............... F16H 61/431

FOREIGN PATENT DOCUMENTS

DE 10 2004 061 861 B4 6/2008
DE 10 2010 020 528 A1 11/2011

* cited by examiner

*Primary Examiner* — Logan Kraft
(74) *Attorney, Agent, or Firm* — Maginot, Moore & Beck LLP

(57) ABSTRACT

A hydrostatic fan drive is operated with a closed circuit and includes a variable-displacement pump with a swept volume that is configured to be adjusted by an adjustment device. The variable-displacement pump is connected by two working lines to a motor that is coupled fixedly in terms of torque to a fan impeller. The fan drive further includes a feed pressure pump and an adjustment pressure line by which the adjustment device is supplied with adjustment pressure medium. A pressure cut-off valve is connected to the adjustment pressure line. The pressure cut-off valve is configured to limit an adjustment pressure, as a function of a high pressure in the working line acting as high-pressure line, to a value such that a certain value of high pressure is not exceeded. The pressure cut-off valve is configured to exhibit pilot control to regulate a working pressure of the variable-displacement pump.

18 Claims, 4 Drawing Sheets

(51) Int. Cl.
*F16H 61/433* (2010.01)
*F04B 49/00* (2006.01)
*F04D 19/00* (2006.01)
*F04D 25/04* (2006.01)
*F16H 61/431* (2010.01)

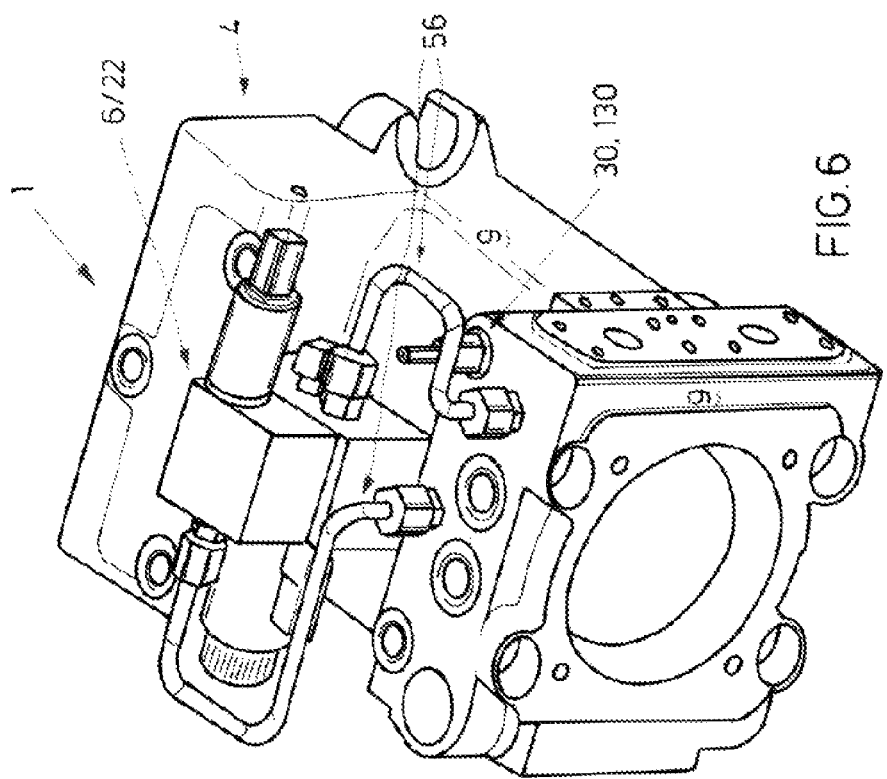
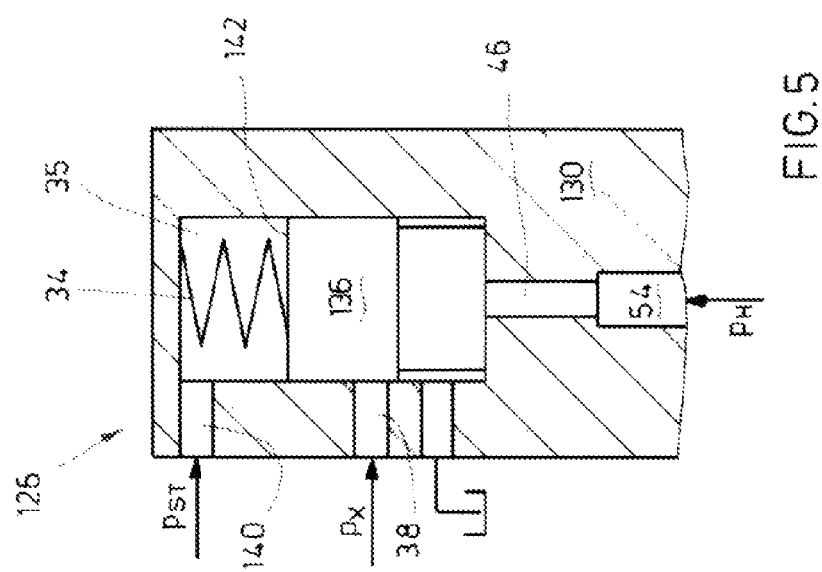
FIG. 5
FIG. 6

HYDROSTATIC DRIVE, IN PARTICULAR HYDROSTATIC FAN DRIVE

This application claims priority under 35 U.S.C. §119 to patent application no. DE 10 2013 214 807.0, filed on Jul. 30, 2013 in Germany, the disclosure of which is incorporated herein by reference in its entirety.

BACKGROUND

The disclosure relates to a hydrostatic drive, in particular a hydrostatic fan drive.

In the case of hydrostatic drives, it is known for a variable-displacement pump and a motor to be connected in a closed circuit via two working lines. Here, a hydraulic adjustment device is provided for adjusting the swept volume of the variable-displacement pump. Here, "swept volume" is to be understood to mean the quantity delivered by the variable-displacement pump per revolution. Adjustment pressure medium is supplied to the adjustment device by means of a feed pump which is driven together with the variable-displacement pump for example by an internal combustion engine. The adjustment pressure medium is supplied to or discharged from the adjustment device as required by means of a directional valve. For example, the pivot angle of the variable-displacement pump, which is in the form of a swashplate-type axial piston pump, is set in this way.

In order that a certain maximum pressure value is not exceeded in that working line of the hydrostatic drive which is conducting the high pressure, pressure cut-off valves are known which limit the maximum adjustment pressure when the high pressure reaches the maximum pressure value. In this way, the adjustment device of the pump is relieved of pressure, such that the latter reduces its swept volume, whereby a limit value for the high pressure in the working line is not exceeded.

Document DE 10 2004 061 861 B4 discloses a hydrostatic drive of said type with a pressure cut-off valve. Since the variable-displacement pump or the adjustment device thereof can be pivoted about, the direction of rotation of the motor can be changed, which results in a switchover of the working line that conducts high pressure. In order that the pressure cut-off valve nevertheless always reduces the adjustment pressure as a function of the high pressure, a shuttle valve is positioned upstream of the control side of the pressure cut-off valve.

Document DE 10 2010 020 528 A1 presents a reversible hydrostatic drive. In said document, the hydrostatic drive is used for driving a fan impeller. Furthermore, the presented fan drive has a pressure regulating valve which can be adjusted by means of a proportional magnet and which serves for regulating the adjustment pressure in each case one of two adjustment chambers that are separated from one another by an adjustment piston, whereas the respective other adjustment chamber is charged with feed pressure. Thus, the pivot angle of the variable-displacement pump is influenced through adjustment of the pressure regulating valve.

A disadvantage of such hydrostatic drives is that, in the case thereof, simple regulation of the high pressure is not possible.

By contrast, it is the object of the disclosure to provide a hydrostatic drive, in particular a hydrostatic fan drive, with which it is possible, with little outlay in terms of apparatus, for the maximum high pressure to be varied in a simple manner during operation.

SUMMARY

The object is achieved by means of a hydrostatic drive having the features of the disclosure.

The hydrostatic drive according to the disclosure is in the form of a closed hydraulic circuit which has a variable-displacement pump, the swept volume of which can be adjusted by means of an adjustment device. Here, the variable-displacement pump is connected via two working lines to a motor, which may be a fixed-displacement motor and which is fixedly coupled to a machine part to be rotated, in particular to a fan impeller. The machine part to be rotated may however for example also be the compactor drum of a roller-compactor. The drive itself may be provided mechanically via a torque converter. In the presence of an inadequate traction force, the compactor drum may be jointly driven with hydrostatic pressure regulation. The compactor drum is thus always at the correct rotational speed, with the maximum possible torque. Also conceivable, for example, is torque-regulated drive of an attachment implement or a trailer on a tractor.

The hydrostatic drive has an adjustment pressure supply which preferably has a feed pressure pump and an adjustment pressure line via which the adjustment device is supplied with adjustment pressure medium. The adjustment pressure supply has a pressure cut-off valve which is connected to the adjustment pressure line in particular downstream of a nozzle and by means of which, as a function of a high pressure in that working line which presently constitutes the high-pressure line, an adjustment pressure is set which is such that a certain value of the high pressure is not exceeded. If the certain value of the high pressure is not initially attained, for example upon starting of the drive, the pressure cut-off valve does not initially intervene. The pressure cut-off valve thus acts as a pressure limiting valve for the high pressure, but limits said high pressure only indirectly via the adjustment of the pump. A hydraulic control line is provided via which the high pressure is signaled to the pressure cut-off valve. In this way, the swept volume of the variable-displacement pump, and thus indirectly the working pressure thereof (equal to high pressure), are reduced. This power reduction of the drive is more energy-saving than, for example, by means of a pressure limiting valve on the working line that conducts high pressure, wherein a pressure limiting valve of said type may additionally be provided for brief and rapid limitation of pressure peaks. According to the disclosure, the pressure cut-off valve is pilot-controlled. By means of a variation of the pilot-control signal, it is thus possible for the setting of the pressure cut-off valve, and thus also the maximum high pressure in the corresponding working line, to be varied. The torque output by a fixed-displacement motor can be adjusted in this way. In the case of a fan impeller, there is a unique relationship between the rotational speed and the torque required for this rotational speed, such that, in the case of a hydrostatic drive according to the disclosure, the fan rotational speed can be set in a simple manner.

Further advantageous refinements of the disclosure are described in the dependent patent claims.

In one particularly preferred refinement, the pressure cut-off valve is connected by way of its adjustment pressure port to the adjustment pressure supply, preferably to the adjustment pressure line, for the pressure regulation thereof.

The pressure cut-off valve furthermore has a high-pressure control port which is connected to the working line acting as high-pressure line, and has a leakage or tank port. Here, a pressure cut-off valve body of the pressure cut-off valve is loaded by means of the working pressure of the high-pressure control port such that a connection from the adjustment pressure port to the leakage port is adjusted in controlled fashion in an opening direction, whereas a spring loads the pressure cut-off valve body in a closing direction. The pressure cut-off valve furthermore has a control pressure port, by means of the control pressure of which the pressure cut-off valve body can be additionally loaded in an opening direction or in a closing direction in the sense of pilot control.

In a particularly preferred refinement, the pressure cut-off valve body is continuously adjustable, whereby the pressure cut-off valve is capable, in regulated operation of the drive according to the disclosure, of setting the adjustment pressure of the adjustment pressure supply. In this way, the working pressure of the drive according to the disclosure is regulated by means of the adjustment device of the variable-displacement pump. In this way, a pressure-regulated drive with a closed circuit is provided which is independent of rotational speed fluctuations of a drive motor of the variable-displacement pump.

In a particularly preferred refinement, the control pressure port of the pressure cut-off valve is charged with control pressure via a pressure reduction valve or pressure regulating valve. In specific terms, a pressure reduction valve is a valve which, from an inlet pressure, generates an equal or lower outlet pressure but which, because it does not have a tank port, is not capable of reducing an excessively high outlet pressure. For such a reduction, it would need to be possible for the outlet of the pressure reduction valve to be discharged to the tank via a nozzle. A pressure regulating valve also has a tank port, and can thus also reduce the outlet pressure. In the case of a hydrostatic drive according to the disclosure, it is preferable for a pressure reduction valve to be provided, because this can reduce the outlet pressure very rapidly. Where reference is made below to a pressure regulating valve, this is however also intended to encompass a pressure reduction valve. The working pressure of the drive according to the disclosure can be regulated by means of the energization of an electromagnet of the pressure regulating valve.

The pressure regulating valve may be connected at the inlet side to the adjustment pressure supply, preferably to the adjustment pressure line. It is thus possible for the adjustment pressure medium of the adjustment pressure supply to be utilized for the pilot control of the pressure cut-off valve.

In a variant with a downward-sloping characteristic curve, the high pressure decreases with increasing control pressure. For this purpose, the pressure cut-off valve body is loaded in an opening direction not only by the high pressure but also by the pressure at the control pressure port. In this way, the high pressure at which the pressure cut-off valve is activated becomes lower the higher the control pressure is.

In the variant with a downward-sloping characteristic curve, it is possible, when the pressure regulating valve is in a main position, for the control pressure port of the pressure cut-off valve to be substantially relieved of control pressure, whereas, when an electromagnet that adjusts the pressure regulating valve is energized, the control pressure port of the pressure cut-off valve is charged with maximum control pressure. The pressure regulating valve thus has an upward-sloping characteristic curve. Thus, in the event of an electrical failure, the pressure cut-off valve is pilot-controlled such that the high pressure in one of the working lines can attain a maximum value. In the case of a fan drive, the pump moves to maximum swept volume, such that a safe state is attained in terms of the cooling of a heat-emitting assembly.

In a variant with an upward-sloping characteristic curve, the high pressure increases with increasing control pressure. For this purpose, the pressure cut-off valve body is loaded in a closing direction via the control pressure port. Since the high pressure now acts on the valve body of the pressure cut-off valve counter to the control pressure, said high pressure must be higher, in order to open the pressure cut-off valve, the higher the control pressure is. In this way, in the event of an electrical failure, the pressure cut-off valve is pilot-controlled such that the high pressure in one of the working lines attains a minimum value. In the case of a hydrostatic drive with upward-sloping characteristic curve between control pressure and high pressure, the pump thus moves, in the event of electrical failure, to a small swept volume if the control pressure is generated by a pressure regulating valve with upward-sloping characteristic curve. Here, when the pressure regulating valve is in a main position, the control pressure port is relieved of pressure to a tank. When an electromagnet of the pressure regulating valve is energized, the control pressure port is charged with control pressure. Here, at the pressure regulating valve, the magnet force and the force generated by the pressure at the regulating outlet of the pressure regulating valve act counter to one another.

Whether the pressure cut-off valve has a downward-sloping or upward-sloping characteristic curve, it generates for the adjustment device of the pump in each case a supply control pressure which is such that a certain value of the high pressure is not exceeded. In the case of an assistive torque-regulated drive of a wheel or of a compactor drum, the pressure that is assumed in an adjustment chamber at the pump is dependent on the rotational speed of the wheel or of the compactor drum. The higher the rotational speed, the further the pump must pivot out, that is to say the higher the adjustment pressure must be, in order to maintain the desired high pressure.

If the variable-displacement pump can be pivoted about, or can be adjusted beyond a zero position, the two working lines are connected via a shuttle valve to the high-pressure control port of the pressure cut-off valve. In this way, a reversal of the direction of rotation of the motor and thus of the direction of rotation of a fan impeller, for example, is possible, for example for the purpose of purging the fan. Here, the capability of being pivoted about, or of being adjusted beyond a zero position, means that the variable-displacement pump can be adjusted from a maximum swept volume with delivery in one direction, across a swept volume of zero, to a maximum swept volume with delivery in the other direction.

Here, in order to obtain a compact configuration, it is preferable if the pressure cut-off valve and the shuttle valve are accommodated in a common valve housing on which the control pressure port, the adjustment pressure port, the leakage port and in each case one port for the two working lines are arranged.

Here, it is also preferable if the pressure cut-off valve body and a shuttle valve body of the shuttle valve are arranged in a valve bore of the valve housing, between which pressure cut-off valve body and shuttle valve body there is provided a plunger for transmitting to the pressure cut-off valve body a pressure force at the outlet of the shuttle valve. The outlet of the shuttle valve is the high-pressure control port of the pressure cut-off valve. The plunger acts counter to the force of the spring of the pressure cut-off valve, wherein the spring can act on the pressure cut-off valve body via a spring bearing.

In a preferred embodiment of the pressure cut-off valve of the drive according to the disclosure, the valve housing is of bushing-like or cartridge-like form such that it can be inserted into a housing of the variable-displacement pump. The valve bore, the pressure cut-off valve body, the shuttle valve body, the plunger and the spring, if appropriate with the spring bearing, are arranged concentrically in the valve housing of the two valves. The control pressure port, the adjustment pressure port, the leakage port and the ports for the two working lines are in the form of radial bores, for example bores in a star configuration, on the valve housing of the two valves.

In a preferred refinement of the variant with a downward-sloping characteristic curve, the control pressure acts on the pressure cut-off valve body via an annular surface formed on an encircling radial widening of the pressure cut-off valve body.

Here, the spring of the pressure cut-off valve may preferably be accommodated in a spring chamber which is delimited by an annular face surface formed on the pressure cut-off valve body. Here, the pressure cut-off valve body has a longitudinal bore via which the spring chamber is connected to a leakage pressure chamber or tank pressure chamber in which an end section of the plunger is arranged. Said end section can be brought to bear against the pressure cut-off valve body in order to activate the pressure cut-off valve or regulate the working pressure.

In a preferred refinement of the variant with an upward-sloping characteristic curve, the spring of the pressure cut-off valve is accommodated in a spring chamber which is delimited by a face surface formed on the pressure cut-off valve body, wherein the control pressure acts on the pressure cut-off valve body via the face surface.

The features of the disclosure are also realized in a hydrostatic variable-displacement pump, in particular in an axial piston pump, the swept volume of which can be set by means of an adjustment device which can be connected via two working ports to a motor and which has an adjustment pressure supply by means of which adjustment pressure medium can be supplied to the adjustment device, wherein the adjustment pressure supply has a pressure cut-off valve by means of which the maximum adjustment pressure can be set as a function of a high pressure in one of the working ports, wherein the pressure cut-off valve is pilot-controlled.

The variable-displacement pump can advantageously be refined with the features, relating thereto, the dependent claims. Here, the adjustment device, a feed pump and the various valves are commonly regarded as constituent parts of the variable-displacement pump.

BRIEF DESCRIPTION OF THE DRAWINGS

Multiple exemplary embodiments of a hydrostatic drive according to the disclosure, in a situation of use as a fan drive, are illustrated in the drawings. The disclosure will now be explained in more detail on the basis of the figures of said drawings.

In the drawings:

FIG. 5 shows a pressure cut-off valve of the exemplary embodiment as per FIG. 4 in a schematic illustration, and FIG. 6 shows a variable-displacement pump of both exemplary embodiments in a perspective illustration.

DETAILED DESCRIPTION

Figure 1:
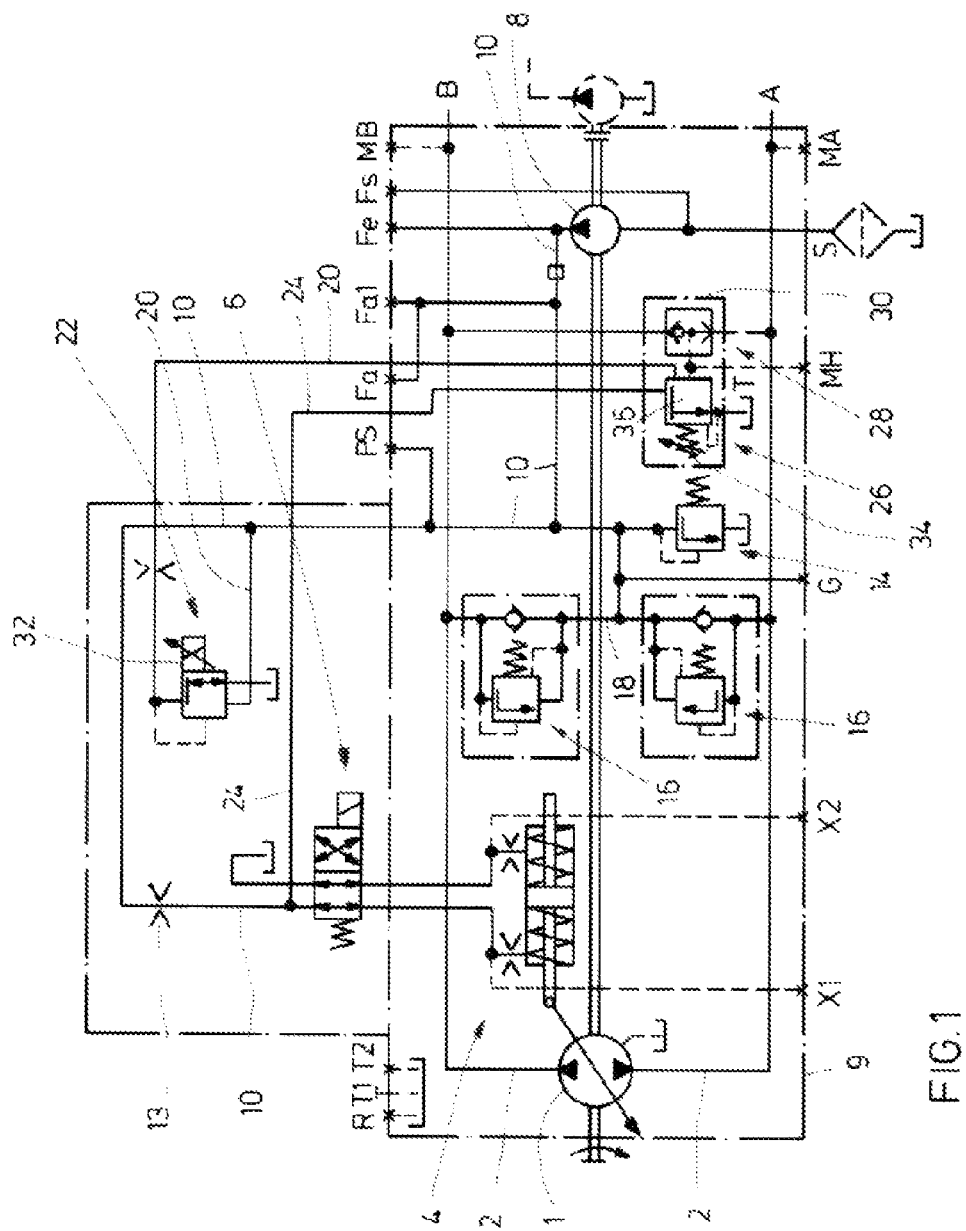
FIG. 1 shows a circuit diagram of a first exemplary embodiment of a fan drive according to the disclosure.

FIG. 1 shows a circuit diagram of the major part of the fan drive according to the disclosure as per a first exemplary embodiment. In a closed circuit there is arranged a variable-displacement pump 1 which is connected via two working lines 2 to a fixed-displacement motor which serves for driving a fan impeller (neither are shown). FIG. 1 shows the working lines only to the extent that they run within the variable-displacement pump. There, they are formed as working ducts in the pump housing. The variable-displacement pump 1 is a swashplate-type axial piston pump, the pivot angle of which can be set and regulated by means of an adjustment device. This is performed by means of a double-acting adjustment cylinder 4 with two pressure chambers to which adjustment pressure medium can be supplied by means of a 4/2 directional valve 6 in the form of a switching valve and from which adjustment pressure medium can be discharged by means of the directional valve 6. The supply of adjustment pressure medium to the adjustment device is performed by means of an adjustment pressure supply. The latter has a feed pump 8 which is integrated into a housing 9 of the variable-displacement pump 1 and which is driven jointly with said variable-displacement pump. The feed pump 8 feeds pressure medium into the working line that is respectively conducting the low pressure, and said feed pump also delivers adjustment pressure medium into an adjustment pressure line 10. From there, the adjustment pressure medium is supplied by means of the 4/2 directional valve 6 to one or the other pressure chamber of the adjustment cylinder 4. The feed pressure, and thus the highest adjustment pressure, are limited by means of a pressure limiting valve 14 to a value in the region of 30 bar.

The two working lines 2 are equipped with a two-way pressure safeguard. The latter is implemented with two pressure limiting valves 16 with infeed function, these being arranged in a bypass line 18 that connects the two working lines 2 to one another. The bypass line 18 is safeguarded by means of the pressure limiting valve 14 that also safeguards the adjustment pressure line 10. In the event of an exceedance of a predetermined pressure in the working line 2 that is conducting high pressure, a pressure medium connection to the respective other working line 2 is opened in controlled fashion for a release of pressure.

In the adjustment pressure line 10 there is situated a nozzle 13. Between said nozzle 13 and the 4/2 directional valve 6, that is to say downstream of the nozzle 13, a pressure cut-off line 24 branches off from the adjustment pressure line 10, which pressure cut-off line issues into a pressure cut-off valve 26. At the pressure cut-off valve 26, the working pressure of the working line 2 that is conducting high pressure is signaled therefrom to the pressure cut-off valve 26 via a shuttle valve 30 such that, if a certain working pressure is exceeded, a throughflow cross section opens and relieves the adjustment pressure line 10 of pressure to a tank T in throttled fashion. In this way, the pivot angle of the variable-displacement pump 1, and thus the working pressure thereof, are reduced.

Upstream of the nozzle 13 of the adjustment pressure line 10, there branches off from the latter a control pressure line 20, the control pressure of which has a regulating action on the pressure cut-off valve 26. For this purpose, in the control pressure line 20, there is arranged a pressure regulating valve 22 which acts as a pressure regulating valve for the variable-displacement pump 1 and by means of the electromagnet 32 of which adjustment pressure medium from the adjustment pressure line 10 is conducted as control pressure in the control pressure line 20 to the pressure cut-off valve 26, whereby the pressure cut-off valve body 36 of the latter can be held in a regulating position. Here, in the first exemplary embodiment of the pressure cut-off valve 26 as per FIG. 1, an adjustable spring 34 acts in a closing direction of the pressure cut-off valve body 36, whereas in the opposite direction, the control pressures of the control pressure line 20 and of the shuttle valve 28 act in an opening direction.

Figure 2:
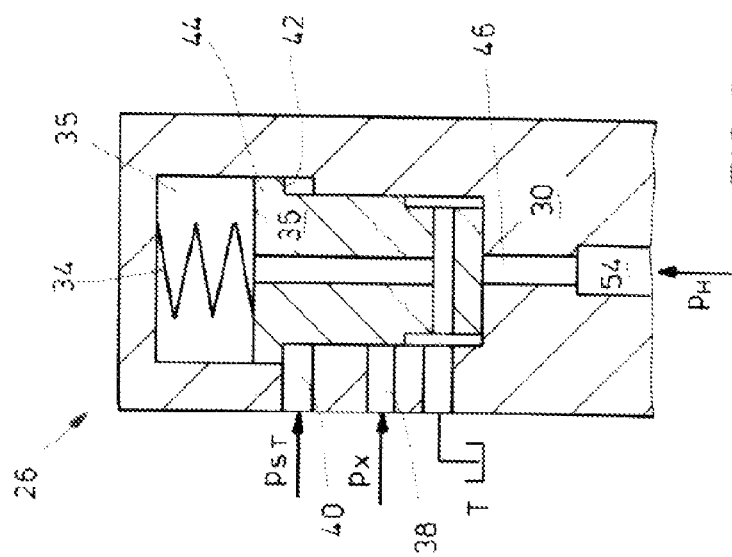
FIG. 2 shows a pressure cut-off valve of the exemplary embodiment as per FIG. 1 in a schematic illustration.

FIG. 2 shows the pressure cut-off valve 26 of the first exemplary embodiment as per FIG. 1 in a schematic illustration. The pressure cut-off valve body 36 is accommodated in displaceable fashion in the valve housing 30, which is illustrated in simplified form. Said pressure cut-off valve body 36 serves for the regulated opening of an adjustment pressure port 38 and thus for the release of the adjustment pressure $p_X$ to the tank port T. For this purpose, the pressure cut-off valve body 36 can be pushed upward counter to the force of the spring 34 by the high pressure $p_H$. The control pressure $p_{St}$ that prevails at the control pressure port 40 likewise acts, via an annular surface 42 formed on a radial widening 44 of the pressure cut-off valve body 36, in an opening direction.

Figure 3:
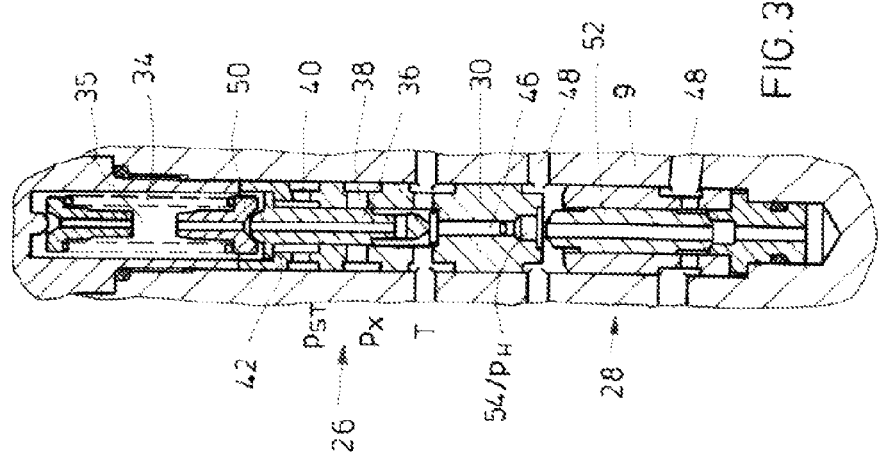
FIG. 3 shows the pressure cut-off valve and a shuttle valve of the exemplary embodiment as per FIGS. 1 and 2 in a sectional view.

FIG. 3 shows the pressure cut-off valve 26 and the shuttle valve 28 of the first exemplary embodiment as per FIGS. 1 and 2 in a sectional view. Both valves 26, 28 are accommodated in the common valve housing 30, which is in the form of a cartridge. Said valve housing is screwed into the housing 9 of the variable-displacement pump and has, on its outer circumference, the control pressure port 40, the adjustment pressure port 38, the tank port T and two ports 48 that are connected in each case to one of the working lines 2 (cf. FIG. 1).

The pressure cut-off valve body 36 extends in the region of the control pressure port 40 and of the adjustment pressure port 38 and has a longitudinal bore via which the tank port T is connected to a face-side spring chamber. Arranged in the latter is the spring 34 which, via a spring bearing 50, loads the pressure cut-off valve body 36 in the manner described above. The shuttle valve 28 is arranged on that side of the pressure cut-off valve 26 which is remote from the spring chamber, the shuttle valve body 52 of which shuttle valve extends approximately in a region between the two ports 48 and likewise has a longitudinal bore, wherein the pressure of that port 48 which is at the higher pressure always prevails in said longitudinal bore.

Between the shuttle valve 28 and the pressure cut-off valve 26, the valve arrangement has the high-pressure control port 54, via which the working pressure of that working line 2 which is at the higher pressure (cf. FIG. 1) is signaled from the shuttle valve 28 to the pressure cut-off valve 26. This is performed via a plunger 46 which, for pressure cut-off purposes, comes to bear at the face side against the pressure cut-off valve body 36 and moves the latter in the opening direction counter to the force of the spring 34.

As described with reference to FIG. 2, the control pressure $p_{St}$ acts on the face surface 42 of the pressure cut-off valve body 36, likewise in the opening direction. By regulating the control pressure $p_{St}$, the pressure cut-off valve body 36 can be held in regulating positions such that the adjustment pressure $p_X$ can be regulated in accordance with the disclosure. Thus, the pressure cut-off valve 26 of the first exemplary embodiment has a downward-sloping characteristic curve, or more precisely, an increase of the control pressure $p_{St}$ results in a decrease of the working pressure of the variable-displacement pump 1.

Figure 4:
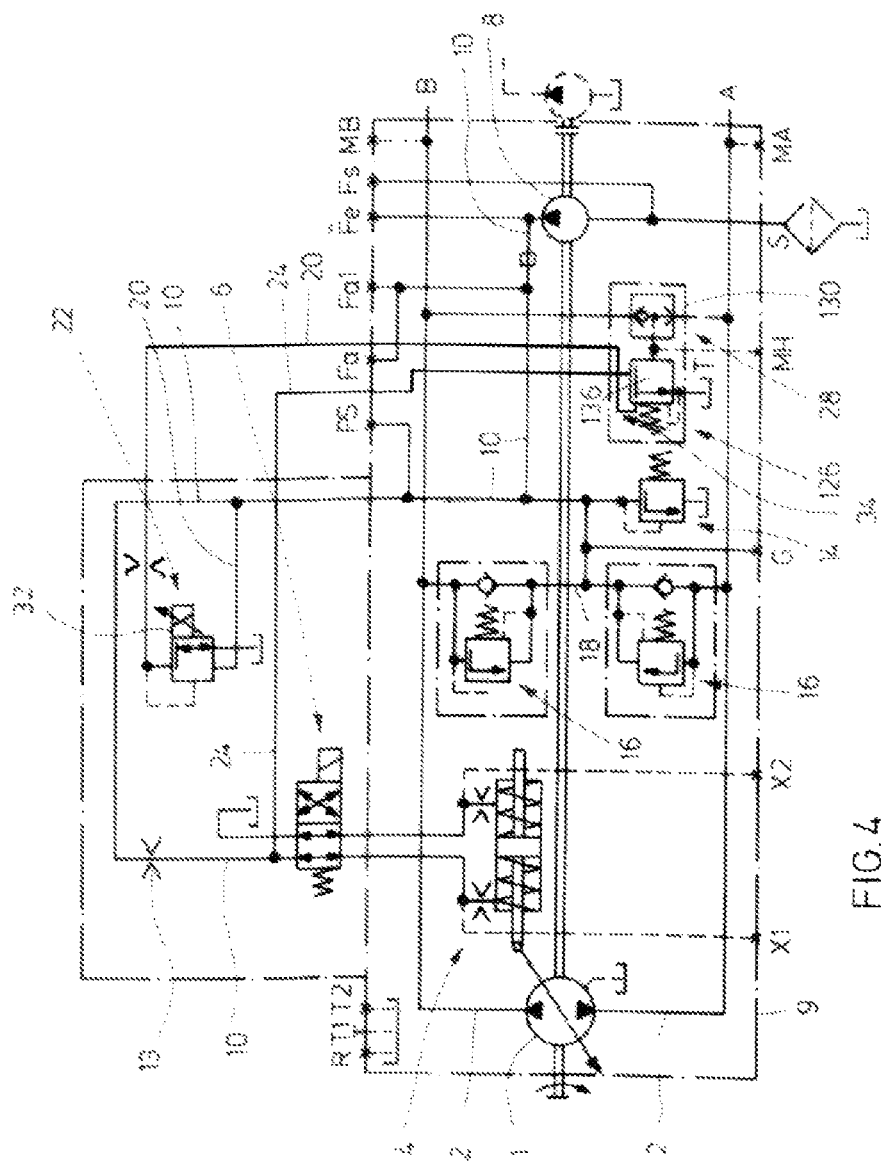
FIG. 4 shows a circuit diagram of a second exemplary embodiment of the fan drive according to the disclosure.

FIG. 4 shows a circuit diagram of a second exemplary embodiment of the fan drive according to the disclosure. The main difference with respect to the first exemplary embodiment according to the preceding figures can be seen in the fact that the control pressure line 20 is connected to the pressure cut-off valve 126 in such a way that the pressure cut-off valve body 136 of the latter is loaded in a closing direction by control pressure $p_{St}$. The second exemplary embodiment of the pressure cut-off valve 126 thus has an upward-sloping characteristic curve. This means that, in the event of an increase of the control pressure $p_{St}$, an increase of the adjustment pressure $p_X$ occurs, which results in an increase of the working pressure in that working line which is conducting high pressure.

FIG. 5 shows the second exemplary embodiment of the pilot-controlled pressure cut-off valve 126 according to the disclosure in a schematic illustration. The control pressure $p_{St}$ acts, via the control pressure port 140 and via a spring chamber 35 and jointly with the spring 34, on a face surface 142 of the pressure cut-off valve body 136, in the closing direction of the latter.

FIG. 6 shows the variable-displacement pump 1 of both exemplary embodiments of the fan drive according to the disclosure in a perspective illustration. Said variable-displacement pump is in the form of a swashplate-type axial piston machine and has the adjustment cylinder 4 for the adjustment of the pivot angle of the swashplate, wherein the directional valve 6 and the pressure regulating valve 22 are installed on the housing 9 in the vicinity of said adjustment cylinder.

As has been explained with reference to FIG. 3, the valve housing 30; 130 is screwed, as an installation valve, into the housing 9 of the variable-displacement pump, wherein in FIG. 6, only a relatively small external section of the valve housing 30; 130 is illustrated. Lines running on the outside of the housing 9 are in the form of pipes 56.

By contrast to the exemplary embodiments shown, it is also possible, instead of the throttles 12, 13 in the adjustment pressure line 10, for a third control edge to be provided in the pressure cut-off valves 26, 126.

A hydrostatic fan drive is disclosed which is operated with a closed circuit and which has a variable-displacement pump, the swept volume of which can be adjusted by means of an adjustment device. Here, the variable-displacement pump is connected via two working lines to a motor which is coupled fixedly in terms of torque to a fan impeller. The fan drive has a feed pressure pump and an adjustment pressure line via which the adjustment device is supplied with adjustment pressure medium. On the adjustment pressure line a pressure cut-off valve is on, by means of which pressure cut-off valve an adjustment pressure can, as a function of a high pressure in the working line acting as high-pressure line, be reduced, whereby the adjustment device is relieved of pressure. In this way, the swept volume of the variable-displacement pump, and thus indirectly the working pressure thereof, are reduced. According to the disclosure, the pressure cut-off valve exhibits pilot control, such that a working pressure of the variable-displacement pump can be regulated.

What is claimed is:

1. A hydrostatic drive, comprising:
   a closed circuit including a variable-displacement pump with a swept volume configured to be adjusted by an adjustment device, the variable-displacement pump being configured to be connected via two working lines to a motor; and
   an adjustment pressure supply configured to supply the adjustment device with adjustment pressure medium, the adjustment pressure supply having a pressure cut-off valve by which the maximum adjustment pressure is configured to be set as a function of a high pressure in one of the working lines,
   whereby the swept volume of the variable-displacement pump is configured to be reduced,
   wherein the pressure cut-off valve is pilot-controlled and has a high-pressure port connected to at least one of the working lines, an adjustment pressure port, and a leakage port,
   wherein a pressure cut-off valve body of the pressure cut-off valve is loaded via the high-pressure port in a direction for opening a connection from the adjustment pressure port to the leakage port,
   wherein a spring loads the pressure cut-off valve body in a closing direction,
   wherein the pressure cut-off valve has a control pressure port via which the pressure cut-off valve body is configured to be loaded in an opening direction or in a closing direction, and
   wherein the control pressure port is configured to be charged with control pressure medium via a pressure regulating valve.

2. The hydrostatic drive according to claim 1, wherein the pressure cut-off valve is continuously adjustable.

3. The hydrostatic drive according to claim 1, wherein the pressure regulating valve is connected at the inlet side to the adjustment pressure supply.

4. The hydrostatic drive according claim 3, wherein the pressure cut-off valve body is configured to be loaded in an opening direction via the control pressure port.

5. The hydrostatic drive according to claim 4, wherein, when the pressure regulating valve is in a main position, the control pressure port is charged with adjustment pressure medium, and wherein, when an actuator of the pressure regulating valve is energized, the control pressure port is relieved of pressure.

6. The hydrostatic drive according to claim 4, wherein a control pressure acts on the pressure cut-off valve body via an annular surface formed on an encircling radial widening of the pressure cut-off valve body.

7. The hydrostatic drive according to claim 6, wherein the spring of the pressure cut-off valve is accommodated in a spring chamber delimited by an annular face surface formed on the pressure cut-off valve body, wherein the pressure cut-off valve body has a longitudinal bore via which the spring chamber is connected to the leakage port and in which an end section of the plunger is arranged, the end section being configured to be brought to bear against the pressure cut-off valve body.

8. The hydrostatic drive according to claim 3, wherein the pressure cut-off valve body is configured to be loaded in a closing direction via the control pressure port.

9. The hydrostatic drive according to claim 8, wherein, when the pressure regulating valve is in a main position, the control pressure port is relieved of pressure, and wherein, when an actuator of the pressure regulating valve is energized, the control pressure port is charged with adjustment pressure medium.

10. The hydrostatic drive according to claim 8, wherein the spring of the pressure cut-off valve is accommodated in a spring chamber delimited by a face surface formed on the pressure cut-off valve body, and wherein a control pressure acts on the pressure cut-off valve body via the face surface.

11. The hydrostatic drive according to claim 1, wherein the variable-displacement pump is configured to be adjusted beyond a zero position, and wherein the two working lines are connected via a shuttle valve to the high-pressure control port of the pressure cut-off valve.

12. The hydrostatic drive according to claim 11, wherein the pressure cut-off valve and the shuttle valve are accommodated in a common valve housing on which the control pressure port, the adjustment pressure port, the leakage port, and in each case one port for the two working lines are arranged.

13. The hydrostatic drive according to claim 12, wherein the pressure cut-off valve body and a shuttle valve body of the shuttle valve are arranged in a valve bore of the valve housing, and wherein a plunger is disposed between the two valve bodies and configured to transmit to the pressure cut-off valve body a pressure force at the outlet of the shuttle valve, the pressure force acting counter to the force of the spring of the pressure cut-off valve.

14. The hydrostatic drive according to claim 13, wherein the valve housing is of bushing-like or cartridge-like form, in which the valve bore, the pressure cut-off valve body, the shuttle valve body, the plunger, and the spring are arranged concentrically, and wherein the control pressure port, the adjustment pressure port, the leakage port, and the ports for the two working lines are formed as radial bores.

15. The hydrostatic drive according to claim 1, wherein the hydrostatic drive is configured as a hydrostatic fan drive.

16. A hydrostatic variable-displacement pump, comprising:
   an adjustment device configured to adjust a swept volume of the variable-displacement pump;
   two working lines configured to connect the variable-displacement pump to a motor; and
   an adjustment pressure supply configured to supply the adjustment device with adjustment pressure medium, the adjustment pressure supply having a pressure cut-off valve by which the maximum adjustment pressure is configured to be set as a function of a high pressure in one of the working lines,
   whereby the swept volume of the variable-displacement pump is configured to be reduced,
   wherein the pressure cut-off valve is pilot-controlled controlled and has a high-pressure port connected to at least one of the working lines, an adjustment pressure port, and a leakage port,
   wherein a pressure cut-off valve body of the pressure cut-off valve is loaded via the high-pressure port in a direction for opening a connection from the adjustment pressure port to the leakage port,
   wherein a spring loads the pressure cut-off valve body in a closing direction,
   wherein the pressure cut-off valve has a control pressure port via which the pressure cut-off valve body is configured to be loaded in an opening direction or in a closing direction, and wherein the control pressure port is configured to be charged with control pressure medium via a pressure regulating valve.

17. The hydrostatic variable-displacement pump according to claim 16, wherein the hydrostatic variable-displacement pump is configured as an axial piston pump.

18. A hydrostatic drive, comprising:
a closed circuit including a variable-displacement pump with a swept volume configured to be adjusted by an adjustment device, the variable-displacement pump being configured to be connected via two working lines to a motor; and
an adjustment pressure supply configured to supply the adjustment device with adjustment pressure medium, the adjustment pressure supply having a pressure cut-off valve by which the maximum adjustment pressure is configured to be set as a function of a high pressure in one of the working lines,
whereby the swept volume of the variable-displacement pump is configured to be reduced,
wherein the pressure cut-off valve is pilot-controlled and has a high-pressure port connected to at least one of the working lines, an adjustment pressure port, and a leakage port,
wherein a pressure cut-off valve body of the pressure cut-off valve is loaded via the high-pressure port in a direction for opening a connection from the adjustment pressure port to the leakage port,
wherein a spring loads the pressure cut-off valve body in a closing direction, and
wherein the pressure cut-off valve has a control pressure port via which the pressure cut-off valve body is configured to be loaded in an opening direction.

* * * * *